United States Patent [19]
Belart et al.

[11] Patent Number: 4,643,492
[45] Date of Patent: Feb. 17, 1987

[54] BRAKE SYSTEM WITH SLIP CONTROL FOR AUTOMOTIVE VEHICLES WITH FRONT-WHEEL DRIVE OR ALL-WHEEL DRIVE

[75] Inventors: Juan Belart, Walldorf; Helmut Fennel, Bad Soden; Wolfram Seibert, Darmstadt; Ivica Batistic, Frankfurt am Main, all of Fed. Rep. of Germany

[73] Assignee: Alfred Teves GmbH, Frankfurt am Main, Fed. Rep. of Germany

[21] Appl. No.: 754,345

[22] Filed: Jul. 11, 1985

[30] Foreign Application Priority Data
Jul. 18, 1984 [DE] Fed. Rep. of Germany ....... 3426456

[51] Int. Cl.$^4$ ............................................. B60T 8/08
[52] U.S. Cl. ..................................... 303/119; 303/111
[58] Field of Search ............... 303/103, 105, 110, 111, 303/113, 116, 119

[56] References Cited
U.S. PATENT DOCUMENTS 4,418,966 12/1983 Hattwig .......................... 303/119 X
4,460,220 7/1984 Petersen ......................... 303/111 X
4,523,792 6/1985 Belart et al. .................... 303/119 X FOREIGN PATENT DOCUMENTS
2401418 7/1975 Fed. Rep. of Germany ...... 303/119

Primary Examiner—Duane A. Reger
Attorney, Agent, or Firm—James B. Raden; William J. Michals

[57] ABSTRACT

A brake system with slip control for vehicles with front-wheel drive or all-wheel drive comprises two hydraulically isolated pressure-medium circuits (2, 3), to which one front wheel and one rear wheel each (VL, HR; VR, HL) are connected. Through a pair of valves (17, 19; 18, 20) consisting of inlet valve and outlet valve, the braking pressure in the two hydraulic pressure-medium circuits is varied upon recognition of an imminent locked condition. The braking pressure in the front-wheel brake is maintained constant by one additional valve (21, 22) connected upstream of the front-wheel brakes (4, 6) in the event of decrease or in the event of further increase of the pressure in the rear-wheel brake (5, 7) that is connected to the same hydraulic pressure-medium circuit (2 or 3, respectively).

4 Claims, 1 Drawing Figure

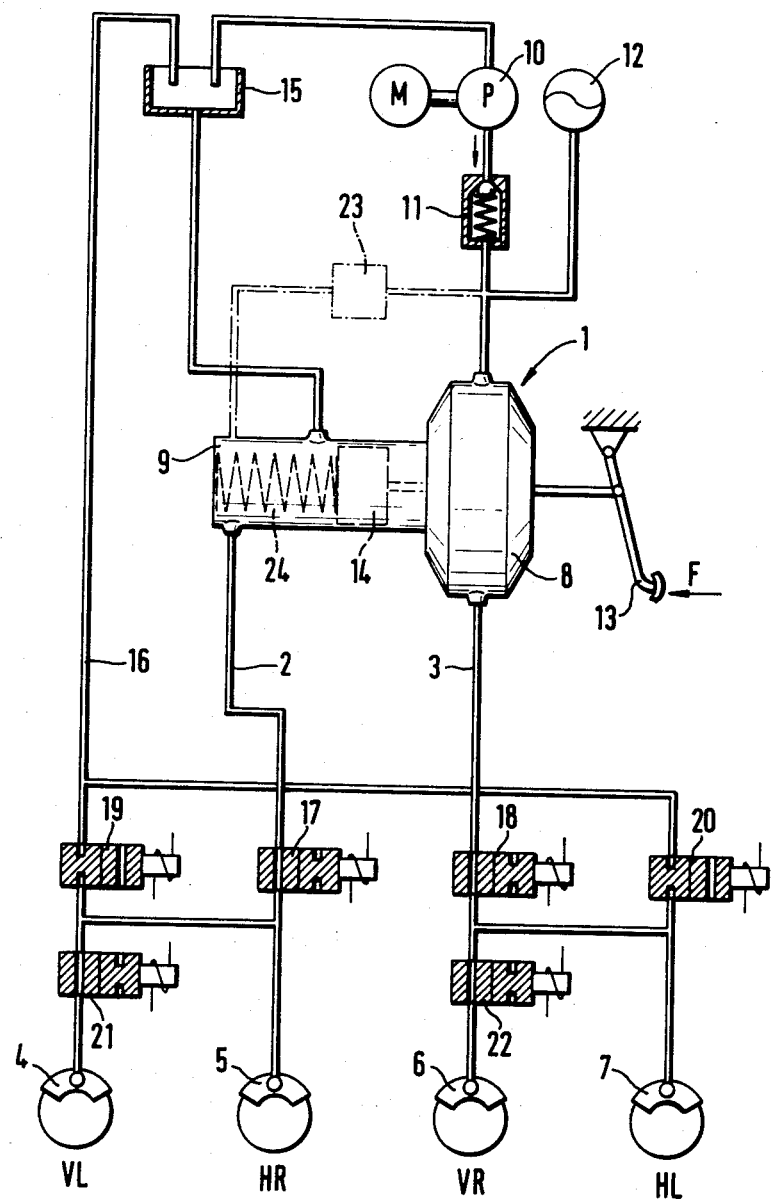

BRAKE SYSTEM WITH SLIP CONTROL FOR AUTOMOTIVE VEHICLES WITH FRONT-WHEEL DRIVE OR ALL-WHEEL DRIVE

BACKGROUND OF THE INVENTION

The present invention relates to a brake system with slip control provided for automotive vehicles with front-wheel drive or all-wheel drive which is equipped with an auxiliary-energy-supplied braking pressure generator. The wheel brakes of a front wheel and of a rear wheel are respectively connected to the generator by way of two hydraulically isolated pressure-medium circuits containing inlet valves switched to their opened condition when inactive. The system further comprising return lines connecting the wheel brakes with a pressure-compensating and supply reservoir and containing utlet valves closed in their inactive position. Wheel sensors are provided for the determination of the wheel rotational behavior as well as electric circuits for the processing of the sensor signals and for the generation of braking pressure control signals which are adapted to be delivered to the inlet valves and the outlet valves.

As is known, locking of the vehicle wheels during a braking operation can be prevented in hydraulic or compressed air-driven brake systems with the aid of so-called inlet and outlet valves which are inserted into the pressure-medium conduit to the wheel brakes or into a return line or a pressure-discharge conduit and which allow to stop further rise of the braking pressure or to reduce the braking pressure as soon as the deceleration and/or the wheel slip exceeds a predetermined value. Systems of this type are provided in variations.

An optimal braking behavior (i.e., high driving and directional stability and, at the same time, a short stopping distance) can be expected if the braking pressure is controlled individually at each vehicle wheel. However, since the expense required for the components including control circuitries, monitoring and safety circuitries, etc. is very high, limitation to two or three control channels in connection with specific criteria such as "select-low, select-high" and with concurrent control of the braking pressure in several wheel brakes results in impairment of the braking behavior because it is expedient to depart from the individual control of all wheels.

Therefore, dual-circuit hydraulic brake systems of the type described have been developed and described, wherein, on detection of an imminent locked condition, one common pair of inlet and outlet valves permits variation of the braking pressure concurrently, jointly for the two wheels connected. If, in this arrangement, the pressure in each control channel is dimensioned according to the select-low principle taking into account the wheel with the worst road contact, a longer stopping distance must be tolerated.

Furthermore, in such brake systems it is known to additionally insert into the pressure-medium conduit to the wheel brake at the rear wheel a two-way/-two position directional control valve. Accordingly, when the rear wheel is relieved from load due to the dynamic axle load shift, locking of the unloaded rear wheel is prevented after change-over of said valve and that, simultaneously, further braking pressure rise at the front wheel can be performed (German patent application No. 31 36 616). In situations in which it is important to make use of the braking effect of the rear wheels, in particular in the presence of a low adherence value, this known measure will not provide any improvement.

Moreover, it has been proposed to derive the reference input for the dimensioning of the braking pressure in the diagonals from the front wheel, but to perform a change-over in certain situations according to predetermined criteria so that the rear wheel instead of the front wheel will temporarily take the lead, that is to determine the braking pressure (German patent document No. 33 14 802.3). Nevertheless, in some situations, joint control of the braking pressure in both wheels connected to a pressure medium circuit is a disadvantage compared to systems with three or four control channels.

It is known to economize control channels in the case of a diagonally split-up dual-circuit brake system by providing one single pressure modulator per pressure-medium circuit; and, for better adaptation of the braking pressure control to the respective situation, to temporarily apply the selection criteria select-low/select-high, in response to which the control of the pressure of the two circuits is effected, to specific groups (European Pat. No. 51 801). In this arrangement, locking of the least loaded wheel is tolerated for a short stopping distance.

It is therefore an object of the present invention to overcome the shortcomings of the known slip-controlled dual-circuit brake systems and to provide a brake system which is economical to manufacture and which, nevertheless, affords effective braking with slip control both at a high and a low friction values in all practical situations, while driving stability and steerability are maintained.

SUMMARY OF THE INVENTION

This object is achieved in a relatively simple manner by improving the brake system so as to insert one additional valve, which is in its opened condition when inactive, into both hydraulic pressure-medium circuits between the outlet of the inlet valve and the wheel brake of the front wheel, the outlet communicating with the port of the outlet valve. According to a preferred embodiment of the present invention, the two brake circuits are diagonally allotted to the vehicle wheels.

For the inlet valves, outlet valves and as additional valves, electromagnetically actuatable multidirectional control valves can be used, in particular two-way/two position directional control valves or four-way/three-position directional control valves, each one thereof performing the function of an inlet valve and of an outlet valve. As a result, the additional expenditure compared to a dual-circuit brake system with two control channels confines itself to two additional two-way/two-position directional control valves and their pertinent actuating electronics. Nevertheless, there results a considerable improvement of the control and of the braking effect, since for example when braking on a dry road and in the presence of a high friction value, the pressure can be decreased at the rear wheel and can be kept constant at the associated front wheel on occurrence of an imminent locked condition. Because the front wheels contribute highly to the braking effect in this situation, this has favorable results on the stopping distance required. After the pressure-medium conduit to the front wheel has been closed in the presence of a low friction value, the braking pressure build-up in the wheel brake of the associated rear wheel can be continued, this will likewise result in a shorter stopping distance in this situation, such as on snow, ice or on aquaplaning, while steerability is maintained.

BRIEF DESCRIPTION OF THE DRAWING

Further features, advantages and applications of the present invention will be gathered from the following description when taken in conjunction with the accompanying drawing in which the single FIGURE provides a schematic illustration of an embodiment of the brake system in accordance with the present invention.

DETAILED DESCRIPTION

In the illustration, the brake system is substantially composed of a braking pressure generator 1 comprising two hydraulically isolated pressure-medium circuits 2, 3, through which the front wheels VL, VR and the rear wheels HR, HL and, respectively, the wheel brakes 4 to 7 of these wheels are diagonally connected.

The braking pressure generator 1, on its part, is composed of a hydraulic power brake booster 8 and a single-type master cylinder 9. To supply the braking pressure generator with auxiliary energy, there is provision of a hydraulic pump 10 with the associated non-return valve 11 and, in addition, a hydraulic accumulator 12. The pump 10 is driven by an electric motor M. The amount of the force F exerted on the brake pedal 13 determines via the booster 8 the magnitude of braking pressure in the pressure-medium circuit 3 directly communicating with the booster, and via the piston 14 of the master cylinder 9, that pressure in the pressure-medium circuit 2.

Further, there is provision of a pressure-compensating and supply reservoir 15, to which the suction side of the pump 10 is connected, on the one hand, and which serves in the usual way for the pressure compensation and as a supply tank for the master cylinder 9, on the other hand. A return line 16 terminates likewise into the reservoir 15.

The valves 19 to 22 for the control of the braking pressure, that means for keeping the braking pressure constant and for decreasing it on the occurrence of a tendency to lock, are all devised as electromagnetically actuatable two-way/two-position directional control valves in the mentioned embodiment. The devices for measuring the wheel rotational behavior, for the processing and the combining of these sensor signals as well as for the generation of the braking-pressure control signals, which temporarily switch the valves 19 to 22 over for the purpose of attaining the desired braking pressure and braking pressure variation, respectively, are known per se and therefore are not illustrated herein.

The inlet valves 17 and 18 in each diagonal are switched to their open position when inactive, i.e. as long as the switching magnets are not energized. In contrast thereto, the associated outlet valves 19 and 20, which establish a connection via the return line 16 to the reservoir 15 for pressure decrease, are normally closed.

Besides, the drawing illustrates in dotted lines a valve assembly 23 which, for instance, as herein, can constitute direct hydraulic connection between the auxiliary energy source 10 to 12 and the pressure chamber or working chamber 24 in the inside of the master cylinder 9 and which allows to supply pressure medium into the circuit 2 for the compensation of the pressure medium discharged into the reservoir 15. Without the provision of a like or a similar valve assembly, there would be the danger that, on repeated pressure decrease via the outlet valve 19, the quantity of pressure medium in the chamber 24 becomes too small. Expediently, the valve assembly 23 is likewise actuated electromagnetically.

The improvement of a two circuit diagonally disposed brake system in accordance with the present invention is accomplished by the addition of valves 21, 22. These valves 21,22 are respectively inserted into the pressure-medium conduits 2 and 3 in between the inlet valves 17, 18 and the front-wheel brakes 4, 6. Valves 21,22 are connected in such a manner that, in the event of energization an opening of the outlet valves 19, 20 which cause a pressure relief or drop in the line pressure being supplied to their respective brake circuits. By closing off these additional valves 21, 22 enables the system to keep the braking pressure in the front-wheel brakes 4, 6 substantially constant or at least to keep it at a value that is above the pressure level in the parallel rear-wheel brake 5 and 7, respectively, these latter rear-wheel brakes having their braking pressure directly affected by the open/closed status of outlet relief valves 19,20. On the other hand, it is also possible by means of these valves 21 and 22 to control the upper limits of the braking pressure in the front-wheel brakes 4, 6 by closing off the supply circuits 2,3, respectively, and thereby permit further pressure increase in the rear-wheel brakes 5, 7. A pressure variation of this type is of advantage, for instance, in the event of high loads and/or slippery roads, that is in the presence of low friction values.

Although the additional valves 21, 22 are simple devices, their use provides a considerable improvement of the control behavior in many situations and in both the presence of high and low friction values.

What is claimed is:

1. A brake system with slip control for automotive vehicles with front-wheel drive or all-wheel drive, said system including an auxiliary-energy-supplied braking pressure generator, a plurality of wheel brakes wherein each pair of a front wheel brake and a diagonally disposed rear wheel brake are connected by way of hydraulically isolated pressure-medium circuits containing inlet valves normally maintained in a substantially open condition when inactive, said system further including return lines connecting the wheel brakes with a pressure-compensating reservoir and each having an outlet valve normally maintained in a substantially closed condition when inactive, and said system further having wheel sensors for the determination of the wheel rotational behavior and outputting signals, electronic circuit means adapted to accept said sensor fed signals and process said sensor signals thereby generating braking pressure control signals, means for applying said control signals to said inlet valves and said outlet valves, the improvement wherein one additional valve (21,22) respectively, which is normally open when inactive, is inserted into each hydraulic pressure-medium circuit (2,3) between the outlet of the respective inlet valve (17,18) and the wheel brake (4,6) of the front wheel (VR,VL), said outlet also communicating with the port of the outlet valve (19,20).

2. A brake system as claimed in claim 1, wherein the inlet valves (17,18), the outlet valves (19, 20) and the additional valves (21, 22) at the front-wheel brakes (4, 6) are provided as multi-directional, two-way/two position directional control valves.

3. A brake system as claimed in claim 1, wherein the inlet valves and outlet valves (17,19; 18,20) associated with the respective circuits are in each circuit united to form a four-way/three-position control valve.

4. A brake system as claimed in claim 1, wherein the inlet valves (17, 18), the outlet valves (19, 20) and the additional improvement valve (21, 22) are provided as electromagnetically actuatable pilot valves.

* * * * *